(12) United States Patent  (10) Patent No.: US 8,126,802 B1
Trueb  (45) Date of Patent: Feb. 28, 2012

(54) COMPUTER SYSTEM AND METHOD FOR MANAGING FINANCIAL FUNDING OF A FINITE INSURANCE POLICY

(75) Inventor: Juerg Trueb, Oberengstringen (CH)

(73) Assignee: Swiss Reinsurance Company Ltd., Zurich (CH)

( * ) Notice: Subject to any disclaimer, the term of this patent is extended or adjusted under 35 U.S.C. 154(b) by 1245 days.

(21) Appl. No.: 11/718,287

(22) PCT Filed: Nov. 1, 2004

(86) PCT No.: PCT/CH2004/000658
§ 371 (c)(1),
(2), (4) Date: Apr. 30, 2007

(87) PCT Pub. No.: WO2006/047894
PCT Pub. Date: May 11, 2006

(51) Int. Cl.
*G06Q 40/00* (2006.01)
(52) U.S. Cl. .............................. 705/38; 705/4
(58) Field of Classification Search ............... 705/4, 38
See application file for complete search history.

(56) References Cited

U.S. PATENT DOCUMENTS

| | | | | |
|---|---|---|---|---|
| 4,837,693 A | * | 6/1989 | Schotz | 705/4 |
| 4,839,804 A | * | 6/1989 | Roberts et al. | 705/36 R |
| 5,136,502 A | * | 8/1992 | Van Remortel et al. | 705/2 |
| 5,590,037 A | * | 12/1996 | Ryan et al. | 705/4 |
| 5,802,500 A | * | 9/1998 | Ryan et al. | 705/36 R |
| 5,839,118 A | * | 11/1998 | Ryan et al. | 705/36 R |
| 6,205,434 B1 | * | 3/2001 | Ryan et al. | 705/36 R |
| 6,304,859 B1 | * | 10/2001 | Ryan et al. | 705/38 |
| 6,615,181 B1 | * | 9/2003 | Segal | 705/4 |

* cited by examiner

*Primary Examiner* — Daniel Felten
(74) *Attorney, Agent, or Firm* — Oblon, Spivak, McClelland, Maier & Neustadt, L.L.P.

(57) ABSTRACT

In a computer system and in a computer-implemented method for managing financial funding of a finite insurance policy provided by an insurer to an insured, a fixed amount of the financial funding is stored as an amount payable by the insured for a calculation period. In addition, a variable amount of the financial funding is calculated based on defined conditions and the variable amount is stored as an amount payable by the insured for the calculation period. Preferably, an index value based on a volatile indicator is stored. Depending on the index value, it is determined whether the variable amount is payable by the insured or whether an insured loss is payable by the insurer to the insured for the calculation period. The variable amount or the insured loss, respectively, is calculated based on the index value. Consequently, funding of the insurance can be accelerated in good calculation periods having no losses. In bad calculation periods, on the other hand, extra funds accumulated in good calculation periods can be used by the insurer to pay insured losses.

24 Claims, 4 Drawing Sheets

COMPUTER SYSTEM AND METHOD FOR MANAGING FINANCIAL FUNDING OF A FINITE INSURANCE POLICY

FIELD OF THE INVENTION

The present invention relates to a computer system and a method for managing financial funding of a finite insurance policy. Specifically, the present invention relates to a computer system and to a computer-implemented method for managing financial funding of a finite insurance policy provided by an insurer to an insured.

BACKGROUND OF THE INVENTION

Figure 1:
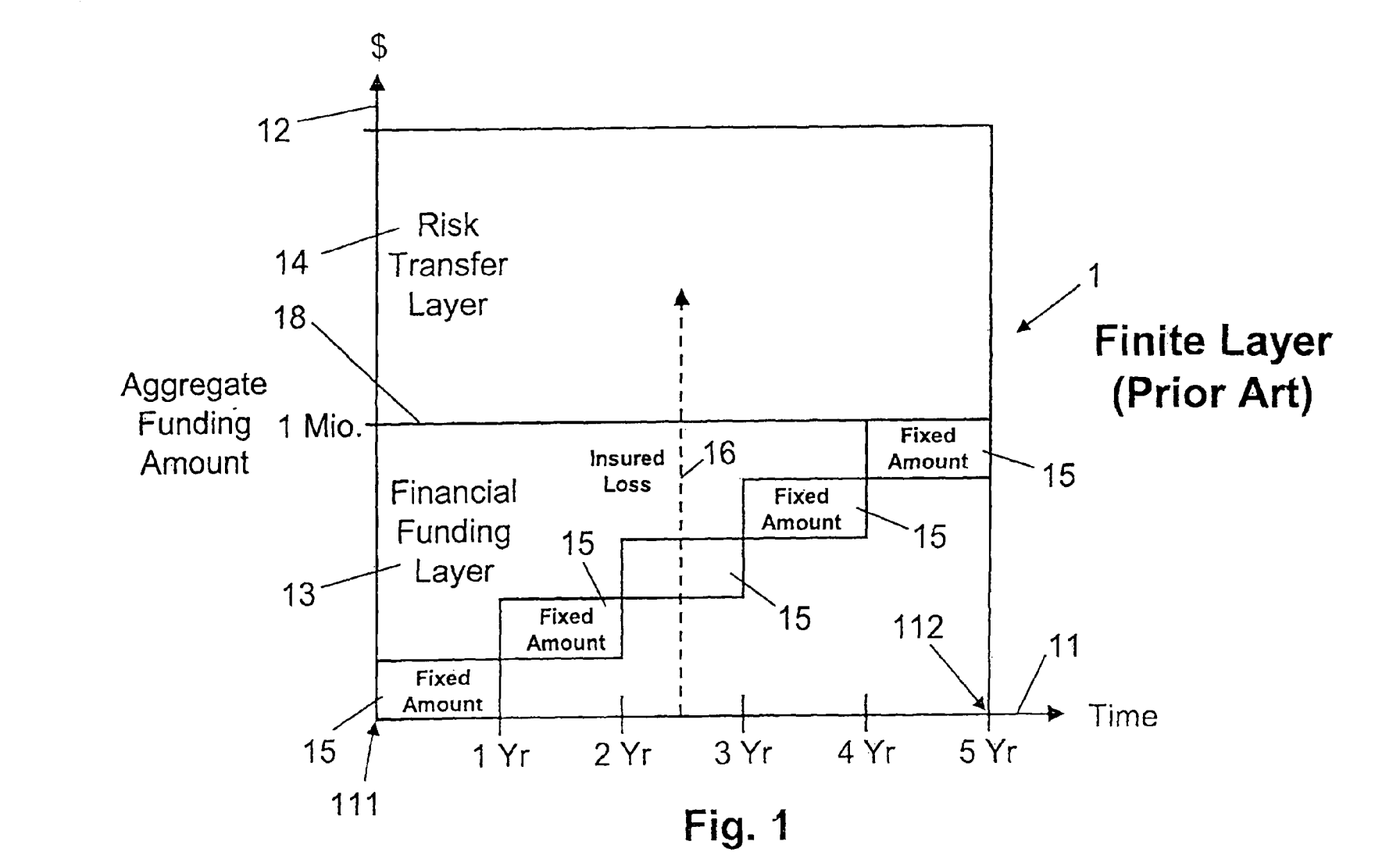
FIG. 1 shows a layer diagram illustrating schematically a finite insurance policy layer according to the prior art, including a financial funding layer and a risk transfer layer.

As is illustrated in FIG. 1, a finite insurance policy includes a financial funding layer 13 and a risk transfer layer 14. As is illustrated in FIG. 1, the tenor of such a finite layer 1 includes a defined number of calculation periods stretching from inception 111 to maturity 112. In FIG. 1, five calculation periods of one year each are indicated on the horizontal time axis 11. On the vertical financial axis 12, the financial funding layer 13 extends to aggregate funding amount 18, which is the sum of the fixed funding amounts 15 of each calculation period. Additionally, the finite layer 1 includes a risk transfer layer 12. For risks covered by the risk transfer layer 12, the insured pays a risk transfer premium per calculation period. Both fixed funding and risk transfer premium add up to one premium amount per calculation period. Regardless of insured losses 16 in a calculation period, the known methods for managing the financial funding of a finite insurance policy require the insured to pay the same fixed premium for every calculation period as a fixed amount of the financial funding of the insurance. Consequently, the insured pays the same premium for a financially beneficial year with no or only small losses as for a financially unbeneficial year with high losses. On the other hand, the insurer receives the same premium from an insured regardless of whether or not insurance payments for insured losses need to be paid by the insurer to the insured in the calculation period.

SUMMARY OF THE INVENTION

It is an object of this invention to provide an alternative computer system and an alternative computer-implemented method for managing financial funding of a finite insurance policy. In particular, it is an object of the present invention to provide a computer system and a computer-implemented method for structuring and quantifying financial funding of the finite insurance policy. In particular, it is an object of the present invention to provide a computer system and a computer-implemented method for structuring and quantifying financial funding of the finite insurance policy such that the financial situation of the insured during a calculation period is considered, e.g. such that the insured does not necessarily pay the same premium for a financially beneficial year with no or only small losses as for a financially unbeneficial year with high losses.

According to the present invention, these objects are achieved particularly through the features of the independent claims. In addition, further advantageous embodiments follow from the dependent claims and the description.

According to the present invention, the above-mentioned objects are particularly achieved in that the computer calculates based on defined conditions a variable amount of the financial funding and the computer stores the variable amount as an amount payable by the insured for a calculation period. Preferably, the conditions are set up such that funding of the insurance can be accelerated with variable amounts of the funding at the end of calculation periods financially beneficial for the insured (i.e. in good calculation periods having no losses or only small losses, for example).

In a preferred embodiment, in addition to calculating by a computer a fixed amount of the financial funding and storing by the computer the fixed amount as an amount payable by the insured to the insurer for a calculation period, the computer determines depending on defined conditions whether a variable amount of the financial funding is payable by the insured for the calculation period or whether an insured loss is payable by the insurer to the insured for the calculation period. The computer calculates based on defined conditions the variable amount or the insured loss, respectively. Moreover, the computer stores the variable amount, as an amount payable by the insured for the calculation period, or the insured loss, as an amount payable by the insurer to the insured for the calculation period, respectively. While funding of the finite insurance policy is accelerated in calculation periods financially beneficial for the insured, insured losses for financially unbeneficial calculation periods can be funded by the additional funds received in calculation periods financially beneficial for the insured.

In the preferred embodiment, in addition to calculating by a computer a fixed amount of the financial funding and storing by the computer the fixed amount as an amount payable by the insured to the insurer for a calculation period, the computer stores an index value based on a volatile indicator. The computer determines depending on the index value whether a variable amount of the financial funding is payable by the insured for the calculation period or whether an insured loss is payable by the insurer to the insured for the calculation period. The computer calculates based on the index value the variable amount or the insured loss, respectively, and the computer stores the variable amount, as an amount payable by the insured for the calculation period, or the insured loss, as an amount payable by the insurer to the insured for the calculation period, respectively. For example, in an embodiment, the risk insured is weather-dependent and the index value is calculated by the computer as an average value of a weather-dependent indicator variable in the calculation period. For example, the index value is an average temperature as measured at one or several weather stations in a defined geographical area based on a time sequence of 24 hours average temperature values. Other examples for the weather-dependent index values include any temperature-based, precipitation-based, sun-shine-based, or wind-based indices measured at one or several weather stations in a defined geographical area. Additionally, such weather-dependent index values can further include the quantity of water in a specific water reservoir, river flow, the amount of renewable energy produced, for example by a hydroelectric power plant, or the amount of agricultural yield per defined area. Thus, for weather-dependent risks, funding of the finite insurance policy can be accelerated in financially beneficial calculation periods with favorable weather. Insured losses (insurance payments) for calculation periods with unfavorable weather can be financed from the additional funding received at the end of financially beneficial calculation periods. Moreover, in calculation periods with unfavorable weather, the insured is required only to pay the fixed amount of the funding. Thus, the financial burden on the insured is reduced in financially unbeneficial calculation periods.

Preferably, the index value is calculated by the computer as an average value of the volatile indicator in the calculation period. The average value can be calculated for the whole duration of the calculation period or for only a defined part of the calculation period, for example for a particular season. For example, to cover the risk of reduced sales of electrical power in a warm winter, the average temperature of the winter months are used to calculate the index value.

Preferably, the index value is compared by the computer to defined threshold values for determining whether the variable amount is payable by the insured or whether the insured loss is payable by the insurer to the insured.

Preferably, the variable amount is calculated by the computer as a first function of the index value for index values being one of lower and higher than a first defined threshold value, and the insured loss is calculated by the computer as a second function of the index value for index values being the respective other one of lower and higher than a second defined threshold value. In other words, depending on the type of risk and the type of index value, a first function is used to calculate the variable amount, if the index value is higher than a first threshold, whereas a second function is used to calculate the insured loss, if the index value is lower than a second threshold value; or the first function is used to calculate the variable amount, if the index value is lower than the first threshold, whereas the second function is used to calculate the insured loss, if the index value is higher than the second threshold value.

Preferably, if it is determined by the computer that the index value is lower than a first defined threshold value, the variable amount payable by the insured is calculated by the computer as a first function of the index value, if it is determined by the computer that the index value is in a range from the first defined threshold value to a second defined threshold value, the variable amount payable by the insured and the insured loss payable by the insurer are set to zero by the computer, and if it is determined by the computer that the index value is higher than the second defined threshold value, the insured loss payable by the insurer is calculated by the computer as a second function of the index value.

In an embodiment, the fixed amount is calculated by the computer as a value proportional to a defined maximum total amount of insured losses payable by the insurer to the insured during a defined number of calculation periods. However, the fixed amounts aggregated over the defined numbers of calculation periods do not add up to the aggregate funding amount. Consequently, in a scenario with prevalent financially unbeneficial calculation periods during the tenor, the aggregate funding paid by the insured is less than in a conventional finite insurance policy.

Preferably, after a defined number of calculation periods, typically at maturity of the finite insurance policy, an experience account balance is calculated by the computer by aggregating the fixed amounts and any variable amounts paid by the insured for the defined number of calculation periods and by subtracting from the fixed and variable amounts aggregated any insured losses paid by the insurer to the insured during the defined number of calculation periods, and the experience account balance calculated is stored by the computer as payable to the insured.

In addition to a computer system and a computer-implemented method for managing financial funding of the finite insurance policy, the present invention also relates to a computer program product including computer program code means for controlling one or more processors of a computer system for managing financial funding of the finite insurance policy, particularly, a computer program product including a computer readable medium containing therein the computer program code means.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 3:
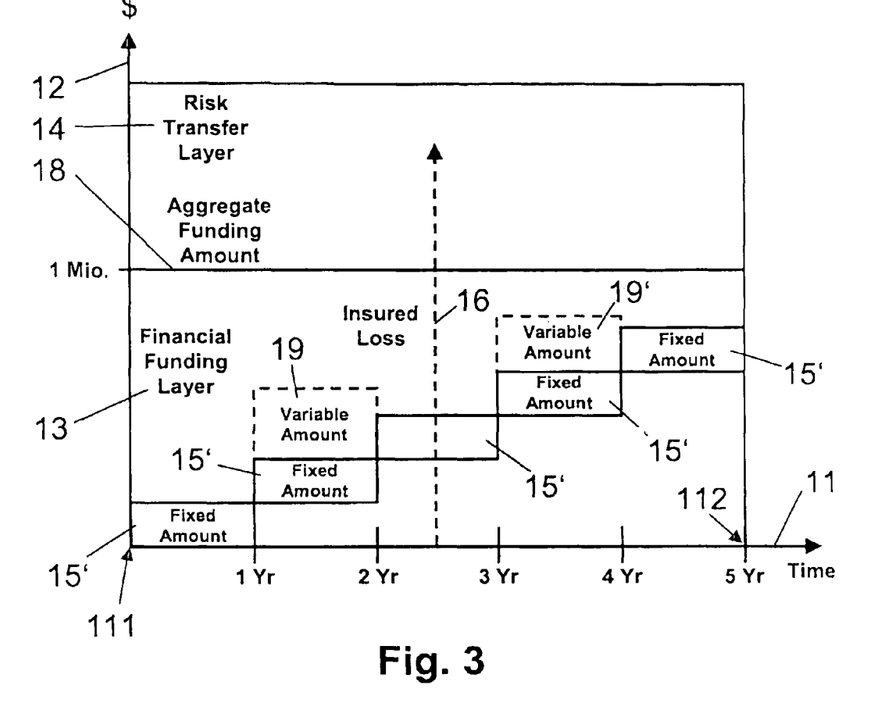
FIG. 3 shows a layer diagram illustrating schematically a finite insurance policy layer having a financial funding layer with both fixed funding amounts and variable funding amounts.

In FIG. 3, reference numerals corresponding to reference numerals used in FIG. 1 relate to corresponding objects, which objects were described in the section on the background of the invention.

Figure 2:
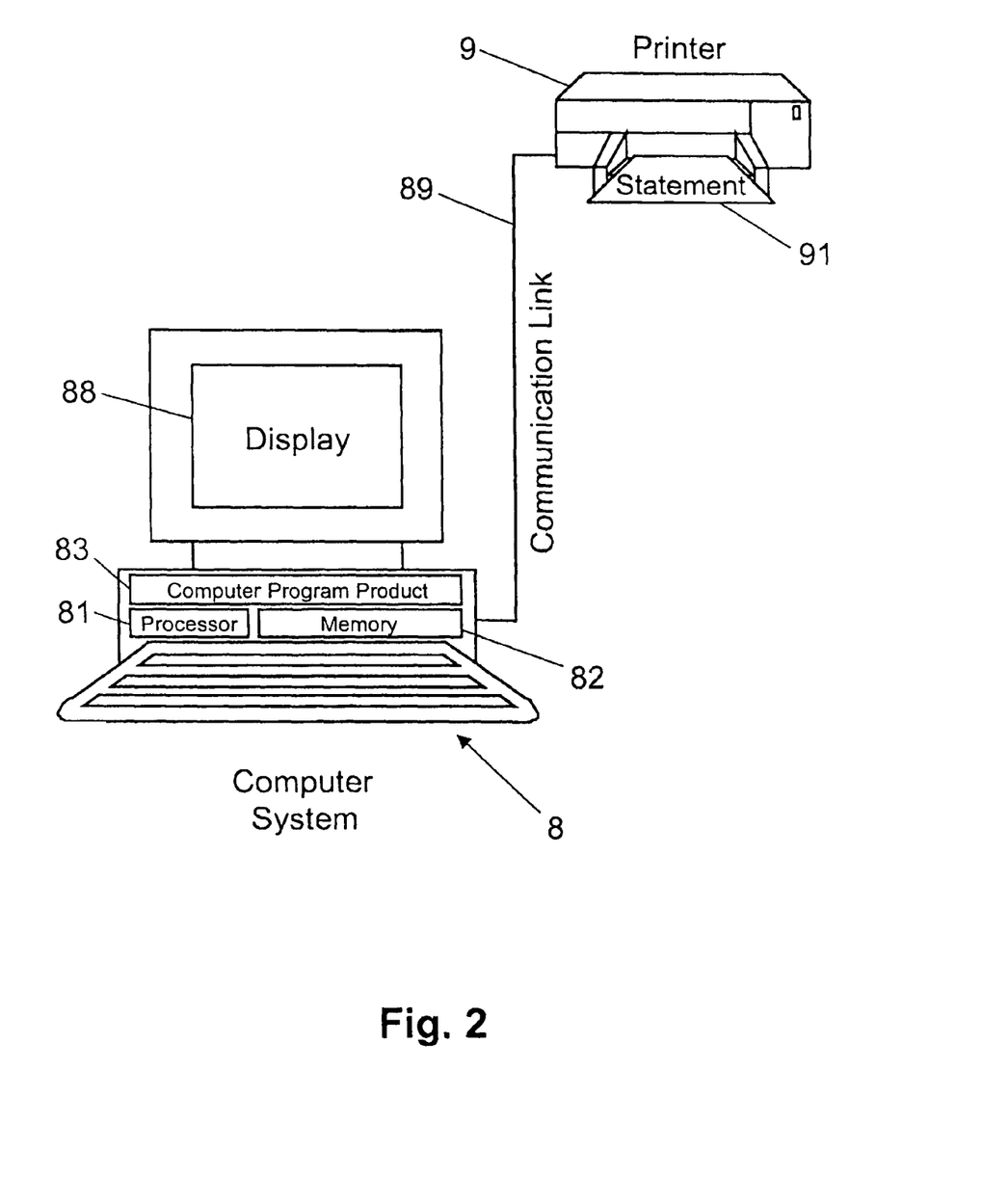
FIG. 2 shows a block diagram illustrating schematically an exemplary configuration of a computer system for practicing embodiments of the present invention, said configuration comprising a computer with a display, a processor, a keyboard, and memory.
Figure 4:
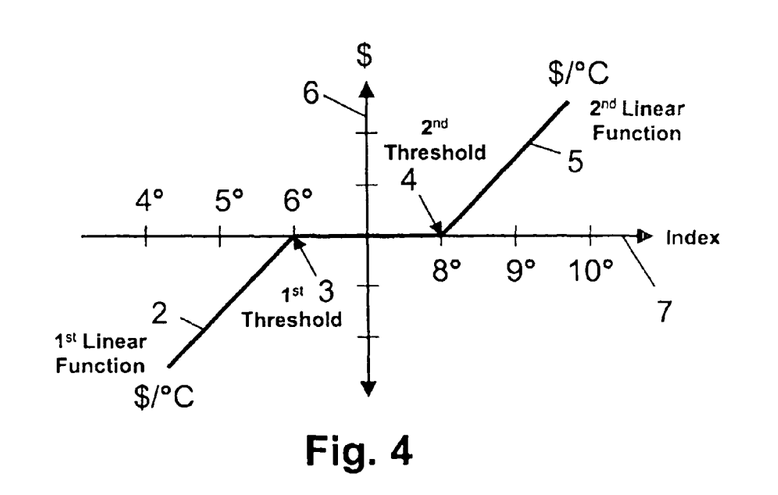
FIG. 4 illustrates an example of conditions for determining the variable funding amount for the finite insurance policy, the example linking the variable funding amount to an index of average temperatures.

In FIG. 2, reference numeral 8 refers to a computer system, for example a computer system 8 comprising a personal computer. As is illustrated schematically, the computer system 8 includes a display 88, at least one processor 81, memory 82 for storing data and programs, including an operating system, as well as a computer program product 83. The computer program product 83 comprises computer program code for controlling processor 81 so that the computer system 8 executes various functions described below in more detail with reference to FIGS. 3, 4 and 5. The computer program code is stored in a computer readable medium, either in memory integrated in the computer system 8 or on a data carrier that can be inserted into the computer system 8. The computer system 8 illustrated in FIG. 2 is connected via communication link 89 to printer 9. Although not illustrated, the computer system 8 may also be connected via a telecommunication network to computers of insurance holders and/or financial institutions.

The computer program code stored in the computer program product 83 may be a software module programmed in any program language, for example in Java (Java is a registered trademark of Sun Microsystems), or one or more script modules for a conventional spreadsheet application such as Microsoft Excel. In the following paragraphs, described are with reference to FIG. 5 the various functions executed by the computer system 8 when processor 81 is controlled by the computer program of computer program product 83.

Figure 5:
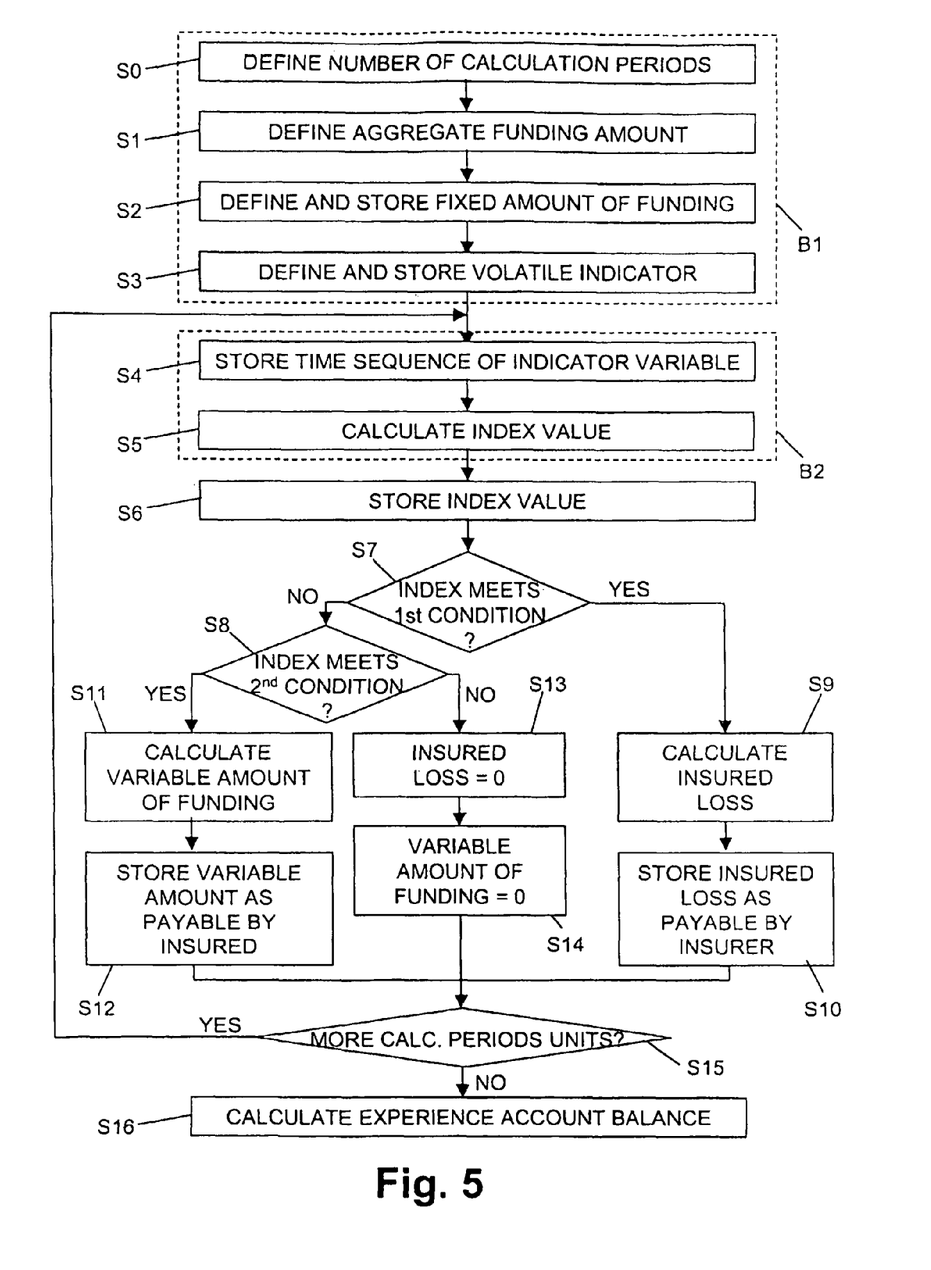
FIG. 5 shows a flow diagram illustrating an example of a sequence of steps executed according to the present invention for managing financial funding of a finite insurance policy provided by an insurer to an insured.

In FIG. 5, block B1 refers to preparatory steps S0, S1, S2 and S3 for defining a specific risk insurance contract. In step S0 the number and duration of calculation periods to be considered in the risk insurance contract is defined. The computer system 8 receives and stores the number and duration of calculation periods to be considered in the risk insurance contract. For example, as illustrated in FIG. 3, from inception 111 to maturity 112 of the risk insurance contract, five calculation periods are included, each calculation period being one year. The number of calculation periods for the risk insurance contract is entered, for example, by an employee of the insurer using the computer system 8 or by an interested insured using a remote computer. The number of calculation periods may also be defined by selecting one of various defined types of insurance policies.

In step S1, the aggregate funding amount to be included in the risk insurance contract is defined. The computer system 8 receives and stores the aggregate funding amount to be included in the risk insurance contract. For example, as illustrated in FIG. 3, the aggregate funding amount is 1 Million Dollars. Like the number of calculation periods to be considered in the finite insurance policy, the aggregate funding amount is entered by an employee of the insurer or by an interested insured.

In step S2, a fixed amount of the financial funding is defined and stored in the memory 82 of the computer system 8. For example, the fixed amount may be a value assigned to the selected one of various defined types of finite insurance policies. Alternatively, the computer system 8 calculates the fixed amount of the financial funding. The fixed amount is calculated as a value proportional to the defined aggregate funding amount. The fixed amount of the financial funding is to be paid by the insured as a part of a fixed premium 15' for every calculation period, as illustrated in FIG. 3. However, unlike in the known finite insurance policies, the fixed premium 15', corresponding to the fixed amount and some premium for the risk transfer layer 14 defined in step S2, aggregated over the defined numbers of calculation periods does not add up to the aggregate funding amount 18, as can be seen in FIG. 3. Preferably, the fixed amount of the financial funding is due and paid by the insured shortly (e.g. one or two weeks) before the beginning of a new calculation period.

In step S3, the value of the volatile indicator is defined and stored.

In FIG. 5, block B2 refers to optional steps S4 and S5. In step S4 a time sequence of a volatile indicator variable is entered and stored in computer system 8. For example, the volatile indicator value is a weather-dependent indicator variable, such as the 24 hour average temperature in a defined geographical area, the average precipitation of the geographical area, the average duration of daily sunshine, the quantity of water in a specific water reservoir, or the amount of energy produced by a hydroelectric power plant. The time sequence may be entered manually or automatically from a sensor, for example on a daily basis, or it may be loaded over a telecommunication network from a database.

In step S5, an index value is calculated as an average value from the time sequence stored in step S4.

Preferably, however, instead of executing steps S4 and S5, the index value is loaded via a telecommunication network from a database.

In step S6, the index value for a calculation period is stored in memory 82 of the computer system 8. For example, the index value is the average winter temperature from November to March for a particular year defined as the calculation period.

In step S7, the computer system 8 checks if the index value meets a first condition. For example, the computer system 8 checks if the index has a value greater than the second threshold 4 on the index axis 7 illustrated in FIG. 4.

If the index value meets the first condition, e.g. if the index value is greater than 8° C., the computer system 8 calculates in step S9 an insured loss to be paid by the insurer to the insured. Preferably, the amount of the insured loss is calculated as a function of the index value, for example a linear function, such as the second linear function 5 illustrated in FIG. 4, or some other function. The second linear function 5 results a Dollar amount (as indicated on the $-axis 6) for an index value greater than 8° C. For example, the insured loss is paid because of warm winter temperatures to compensate for the loss of revenue from low sales of electrical power. Before the calculated amount can be stored as an insured loss payable by the insurer to the insured, the computer system 8 checks if the aggregate funding amount has already been reached by insurance payments made to the insured for insured losses in previous calculation periods whereby taking into account any amounts financed through fixed and variable amounts of funding. If the aggregate funding amount has been reached, the insured loss payable by the insurer for the calculation period is set to zero. If the aggregate funding amount has not yet been reached, the part of the calculated amount that, added to the insurance payments made to the insured for insured losses in previous calculation periods, does not exceed the aggregate funding amount is the insured loss payable by the insurer for the calculation period.

In step S10, the insured loss calculated in step S9 is stored by the computer system 8 as an amount payable by the insurer to the insured for the calculation period. Preferably, the insurance payments for insured losses are paid by the insurer to the insured shortly (e.g. one or two weeks) after the end of the respective calculation period. The computer system 8 stores an aggregate total amount of the insured losses paid by the insurer to the insured.

If the index value does not meet the first condition, e.g. if the index value is smaller or equal to 8° C., the computer system 8 checks in step S8 if the index value meets a second condition. For example, the computer system 8 checks if the index has a value smaller than the first threshold 3 on the index axis 7 illustrated in FIG. 4.

If the index value meets the second condition, e.g. if the index value is smaller than 6° C., the computer system 8 calculates in step S11 a variable amount of the financial founding to be paid by the insured into the fund of the risk insurance. Preferably, the variable amount of the financial founding is calculated as a function of the index value, for example a linear function, such as the first linear function 2 illustrated in FIG. 4, or a hyperbolic function. The first linear function 2 results a Dollar amount (as indicated on the $-axis 6) for an index value smaller than 6° C. For example, the variable amount is paid because of cold winter temperatures to acknowledge high revenue from large sales of electrical power. In step S12, the variable amount is stored by the computer system 8 as an amount payable by the insured into the fund of the risk insurance for the calculation period. In FIG. 3, examples of variable amounts of the funding to be paid by the insured are illustrated as variable premiums 19, 19' payable by the insured for the calculation periods of the second or fourth year, respectively. Preferably, the variable amount of the financial founding is due and paid by the insured shortly (e.g. one or two weeks) after the end of the respective calculation period.

If the index value does not meet the second condition, e.g. if the index value is greater or equal to 6° C. and smaller or equal to 8° C., in step S13, the computer system 8 sets the amount of the insured loss to be paid by the insurer to the insured to zero for the calculation period. Furthermore, in step S13, the computer system 8 sets the amount of the financial founding to be paid by the insured into the fund of the risk insurance to zero for the calculation period. For example, neither an insured loss nor a variable amount of funding is paid because of average winter temperatures resulting in regular revenue from regular sales of electrical power.

In step S15, the computer checks if the maturity 112 of the risk insurance contract has been reached or if there are more calculation periods remaining. If there are more calculation periods remaining, the computer system 8 proceeds in step S4 or step S6, respectively. Otherwise, if maturity 112 of the risk insurance contract has been reached, the computer system 8 proceeds in step S16.

In step S16, the computer system 8 calculates an experience account balance, i.e. a balance of the financial funding at maturity 112 of the risk insurance contract. The experience account balance is calculated by aggregating the fixed amounts and any variable amounts paid by the insured from inception 111 to maturity 112 of the risk insurance contract. Any insurance payments paid by the insurer to the insured for insured losses from inception 111 to maturity 112 of the risk insurance contract are subtracted from the aggregated value. Moreover, accrued interest for positive funds of the insured (e.g. fixed and variable amounts not used for funding losses) is added and accrued interest for negative funds of the insured (e.g. predefined losses in case of absence of fund) is subtracted from the balance. Finally, if the calculated experience account balance of the risk insurance contract is positive, the calculated experience account balance, i.e. the maturity value of the finite insurance policy, is stored by the computer 8 as an amount payable by the insurer to the insured. Preferably, the positive experience account balance is paid by the insurer to the insured shortly (e.g. one or two weeks) after maturity 112 of the risk insurance contract.

Payments are made by the computer system 8 by printing checks on printer 9 or by means of electronic funds transfer. Financial statements 91, for example invoicing statements for fixed amounts of the funding and/or variable amounts of the funding to be paid by the insured or statements of account, are printed by the computer system 8 on printer 9. Electronic copies or versions of the financial statements can also be transmitted to remote computers of the insured via a telecommunication network.

It must be pointed out that different sequences of steps S0 to S16 are possible without deviating from the scope of the invention. Consequently, the particular order of steps S0 to S16 set forth in the specification should not be construed as limitations on the claims. The foregoing disclosure of the embodiments of the invention has been presented for purposes of illustration and description. It is not intended to be exhaustive or to limit the invention to the precise forms disclosed. Variations and modifications of the embodiments described herein will be apparent to one skilled in the art in light of the above disclosure. Particularly, different conditions can be defined for determining whether a variable amount of the financial funding is payable by the insured or whether an insured loss is payable by the insurer to the insured for the calculation period. Likewise, different functions can be defined for calculating the variable amount of the financial funding and the insured loss.

What is claimed is:

1. A computer system for managing financial funding of a finite insurance policy provided by an insurer to an insured, the system comprising:
    means for storing a fixed amount of the financial funding as an amount payable by the insured for a calculation period;
    means for storing an index value based on a volatile indicator;
    means for selecting, depending on the index value, from a variable amount of the financial funding being payable by the insured for the calculation period and an insured loss being payable by the insurer to the insured for the calculation period;
    means for calculating, based on the index value, the variable amount or the insured loss, respectively, based on a result of the selecting; and
    means for storing the variable amount, as an amount payable by the insured for the calculation period, or the insured loss, as an amount payable by the insurer to the insured for the calculation period, respectively, based on the result of the selecting.

2. The system according to claim 1, further comprising means for calculating the index value as an average value of the volatile indicator in the calculation period.

3. The system according to claim 1, wherein the means for selecting from a variable amount being payable by the insured and an insured loss being payable by the insurer, compares the index value to defined threshold values for selecting a variable amount being payable by the insured or an insured loss being payable by the insurer.

4. The system according to claim 1, wherein the means for calculating the variable amount or the insured loss, respectively, calculates the variable amount as a first function of the index value, for index values being one of lower and higher than a first defined threshold value, and calculates the insured loss as a second function of the index value, for index values being the respective other one of lower and higher than a second defined threshold value.

5. The system according to claim 1, wherein the means for calculating the variable amount or the insured loss, respectively, calculates the variable amount, payable by the insured, as a first function of the index value, for index values lower than a first defined threshold value, sets to zero the variable amount, payable by the insured, and the insured loss, payable by the insurer, for index values in a range from the first defined threshold value to a second defined threshold value, and calculates the insured loss, payable by the insurer, as a second function of the index value, for index values higher than the second defined threshold value.

6. The system according to claim 1, wherein risk insured is weather-dependent, and wherein the system further comprises means for calculating the index value as an average value of a weather-dependent indicator variable in the calculation period.

7. The system according to claim 1, further comprising means for calculating a fixed amount as a value proportional to a defined maximum total amount of insured losses, payable by the insurer to the insured during a defined number of calculation periods.

8. The system according to claim 1, wherein the system further comprises means for calculating, after a defined number of calculation periods, an experience account balance by aggregating the fixed amounts and any variable amounts, paid by the insured for the defined number of calculation periods, and by subtracting from the fixed and variable amounts aggregated any insured losses, paid by the insurer to the insured during the defined number of calculation periods; and wherein the system further comprises means for storing the experience account balance as payable to the insured.

9. A computer-implemented method for managing financial funding of a finite insurance policy provided by an insurer to an insured, the method comprising:
    storing, by the computer, a fixed amount of the financial funding as an amount payable by the insured for a calculation period;
    storing, by the computer, an index value based on a volatile indicator;

selecting, by the computer and depending on the index value, from a variable amount of the financial funding being payable by the insured for the calculation period and an insured loss being payable by the insurer to the insured for the calculation period;

calculating, by the computer and based on the index value, the variable amount or the insured loss, respectively, based on a result of the selecting; and storing by the computer the variable amount, as an amount payable for the calculation period by the insured, or the insured loss, as an amount payable for the calculation period by the insurer to the insured, respectively, based on the result of the selecting.

10. The method according to claim 9, wherein the index value is calculated by the computer as an average value of the volatile indicator in the calculation period.

11. The method according to claim 9, wherein the index value is compared by the computer to defined threshold values for selecting the variable amount is being payable by the insured or the insured loss being payable by the insurer to the insured.

12. The method according to claim 9, wherein the variable amount is calculated by the calculating as a first function of the index value, for index values being one of lower and higher than a first defined threshold value, and wherein the insured loss is calculated by the calculating as a second function of the index value, for index values being the respective other one of lower and higher than a second defined threshold value.

13. The method according to claim 9, wherein, when the index value is lower than a first defined threshold value, the variable amount, payable by the insured, is calculated by the calculating as a first function of the index value, and when the index value is in a range from the first defined threshold value to a second defined threshold value, the variable amount, payable by the insured, and the insured loss, payable by the insurer, are both set to zero by the calculating, and when the index value is higher than the second defined threshold value, the insured loss, payable by the insurer, is calculated by the calculating as a second function of the index value.

14. The method according to claim 9, wherein risk insured is weather-dependent, and wherein the index value is calculated by the computer as an average value of a whether dependent indicator variable in the calculation period.

15. The method according to claim 9, wherein a fixed amount is calculated by the computer as a value proportional to a defined maximum total insured losses, payable by the insurer to the insured during a defined number of calculation periods.

16. The method according to claim 9, wherein after a defined number of calculation periods an experience account balance is calculated by the computer by aggregating the fixed amounts and any variable amounts, paid by the insured for the defined number of calculation periods, and by subtracting from the fixed and variable amounts aggregated any insured losses, paid by the insurer to the insured during the defined number of calculation periods; and wherein the experience account balance calculated is stored by the computer as payable to the insured.

17. A non-transitory computer readable medium having stored thereon a computer program code that when executed by one or more processors of a computer system causes the computer system to implement a method for managing financial funding of a finite insurance policy provided by an insurer to an insured, comprising:

storing a fixed amount of the financial funding as an amount payable by the insured for a calculation period;

storing an index value based on a volatile indicator;

selecting, depending on the index value, from a variable amount being payable by the insured for the calculation period and an insured loss being payable by the insurer to the insured for the calculation period;

calculating, based on the index value, the variable amount or the insured loss, respectively, based on a result of the selecting; and storing the variable amount as an amount payable for the calculation period by the insured, or the insured loss, as an amount payable for the calculation period by the insurer to the insured, respectively, based on the result of the selecting.

18. The non-transitory computer readable medium according to claim 17, further comprising computer program code means for controlling the processors such that, when the index value is lower than a first defined threshold value, the calculating calculates the variable amount, payable by the insured, as a first function of the index value, when the index value is in a range from the first defined threshold value to a second defined threshold value, the calculating sets to zero the variable amount, payable by the insured, and the insured loss, payable by the insurer, and when the index value is higher than the second defined threshold value, the calculating calculates the insured loss, payable by the insurer as a second function of the index value.

19. A computer system for managing financial funding of a finite insurance policy provided by an insurer to an insured, the system comprising:

means for calculating based on defined conditions a variable amount of the financial funding; and means for storing the variable amount, as an amount payable by the insured for a calculation period.

20. The computer system according to claim 19, further comprising:

means for storing a fixed amount of the financial funding as an amount payable by the insured for a calculation period;

means for determining depending on defined conditions whether a variable amount of the financial funding is payable by the insured for the calculation period or whether an insured loss is payable by the insurer to the insured for the calculation period;

means for calculating based on the defined conditions the variable amount or the insured loss, respectively; and means for storing the variable amount, as an amount payable for the calculation period by the insured, or the insured loss, as an amount payable for the calculation period by the insurer to the insured, respectively.

21. A computer-implemented method for managing financial funding of a finite insurance policy provided by an insurer to an insured, the method comprising:

calculating by the computer based on defined conditions a variable amount of the financial funding; and storing by the computer the variable amount as an amount payable by the insured for a calculation period.

22. A computer-implemented method according to claim 21, further comprising:

storing by the computer a fixed amount of the financial funding as an amount payable by the insured for a calculation period;

determining by the computer depending on defined conditions whether a variable amount of the financial funding is payable by the insured for the calculation period or whether an insured loss is payable by the insurer to the insured for the calculation period;

calculating by the computer based on the defined conditions the variable amount or the insured loss, respectively; and storing by the computer the variable amount, as an amount payable for the calculation period by the insured, or the insured loss, as an amount payable for the calculation period by the insurer to the insured, respectively.

23. A non-transitory computer readable medium having stored thereon a computer program product comprising computer program code means for controlling one or more processors of a computer system for managing financial funding of a finite insurance policy provided by an insurer to an insured, such that the computer system calculates based on defined conditions a variable amount of the financial funding; and that the computer system stores the variable amount as an amount payable by the insured for a calculation period.

24. The non-transitory computer readable medium having stored thereon a computer program product according to claim 23, further comprising computer program code means for controlling the processors such that the computer system stores a fixed amount of the financial funding as an amount payable by the insured for a calculation period; that the computer system selects, depending on defined conditions, from a variable amount being payable by the insured for the calculation period or an insured loss being payable by the insurer to the insured for the calculation period; that the computer system calculates based on the defined conditions the variable amount or the insured loss, respectively based on a result of the selecting; and that the computer system stores the variable amount, as an amount payable for the calculation period by the insured, or the insured loss, as an amount payable for the calculation period by the insurer to the insured, respectively, based on the result of the selecting.

\* \* \* \* \*